United States Patent
Kreiner et al.

(10) Patent No.: US 6,688,683 B1
(45) Date of Patent: Feb. 10, 2004

(54) METHOD FOR OPERATING A SLIDING-LIFTING ROOF

(75) Inventors: Steffen Kreiner, Esslingen (DE); Andreas Rodewald, Herrenberg (DE)

(73) Assignee: DaimlerChrysler AG, Stuttgart (DE)

(*) Notice: Subject to any disclaimer, the term of this patent is extended or adjusted under 35 U.S.C. 154(b) by 0 days.

(21) Appl. No.: 10/070,717

(22) PCT Filed: Sep. 8, 2000

(86) PCT No.: PCT/EP00/08762
§ 371 (c)(1),
(2), (4) Date: Jul. 10, 2002

(87) PCT Pub. No.: WO01/19634
PCT Pub. Date: Mar. 22, 2001

(30) Foreign Application Priority Data

Sep. 10, 1999 (DE) .......................................... 199 43 234

(51) Int. Cl.⁷ .................................................. B60J 7/05
(52) U.S. Cl. ........................................ 296/221; 296/223
(58) Field of Search .................................. 296/221, 223

(56) References Cited

U.S. PATENT DOCUMENTS 3,829,155 A   8/1974  Lutz
4,629,953 A   12/1986 Inoue et al.
6,290,288 B1 * 9/2001  Ritter et al. ................. 296/221
2002/0070587 A1 * 6/2002 Horiuchi et al. ............. 296/223

FOREIGN PATENT DOCUMENTS

DE   3840724   6/1989
DE   19512342  7/1998
DE   29820589  4/1999

* cited by examiner

*Primary Examiner*—Dennis H. Pedder
(74) *Attorney, Agent, or Firm*—Venable LLP; Robert Kinberg

(57) ABSTRACT

A method for the operation of the cover of a slide-and-tilt sunroof for closing a roof opening of a vehicle from an open position, at least partially exposing the roof opening is provided. To close it, the cover is slid into the area of the roof opening and moved towards an opening edge of the roof opening, and, after commencement of the movement towards the opening edge of the roof opening, the movement of the cover is driven in such a way that the cover reaches the closed position in the same closing direction as when closing from its elevated position.

12 Claims, 2 Drawing Sheets

METHOD FOR OPERATING A SLIDING-LIFTING ROOF

BACKGROUND AND SUMMARY OF THE INVENTION

The invention relates to a method for the operation of a slide-and-tilt sunroof including sliding a cover into an area of the roof opening, and moving the cover towards an opening edge of the roof opening.

German Patent Document DE 38 40 724 C2 discloses a slide-and-tilt sunroof for a motor vehicle. Its cover can be adjusted by means of an electric motor, reversible in its direction of rotation, in order to provide an open or closed position of the cover in relation to a roof opening of the motor vehicle. In its sliding roof function, the cover is usually first pushed forwards, in the direction of travel of the vehicle, from the open position into the closed position and then raised, so that the outer edges of the cover bear against the roof seal, which is arranged at the opening edge of the roof opening. The friction forces occurring between the cover and the roof seal during the aforementioned raising of the cover into its closed position are disadvantageous. They inhibit the raising of the cover into the closed position. The mechanical play that is present and insufficient inherent rigidity in the combined action of the tilt-and-slide sunroof assembly mean that the support forces of the adjusting mechanism are not sufficient to bring the cover into the same closed position in its function as sliding roof on the one hand and its function as tilting roof on the other. These differing closed positions in the raising direction give the motor vehicle roof panel a visually unattractive overall appearance. Moreover, the divergence in the raising direction of the outer surface of the cover (especially in the sliding roof function) and the adjacent roof panel can lead to an unwelcome collecting of water on the outside of the cover.

The object of the invention is to prevent differing closed positions of the cover of a slide-and-tilt sunroof in its tilting roof function and its sliding roof function.

This object is achieved by sliding the cover into an area of the roof opening, and moving the cover towards an opening edge of the roof opening, wherein, after commencement of the movement towards the opening edge of the roof opening, the movement of the cover is driven in such a way that the cover reaches a closed position in the same closing direction as when closing from an elevated position.

According to the invention, after movement has commenced, the movement of the cover towards the opening edge of the roof opening is driven in such a way that the cover reaches the closed position in the same direction of travel as is provided for when bringing the cover from its elevated position (=open position of the tilting roof) into the closed position. In this way the sequence of movements of the cover immediately before reaching the closed position is the same in the sliding roof function as in the tilting roof function. In both functions the closed position is arrived at from the same closing direction. This ensures that the cover in its closed position always lies in the same position relative to the surrounding roof panel, irrespective of its function as tilting roof or sliding roof. Differing closed positions of the sliding roof function on the one hand and the tilting roof function on the other are avoided. In adjusting the height of the cover, only a single home position (=closed position) actually needs to be taken into account. Suitably adjusted, this single home position gives a visually attractive overall appearance to the outer surface in the transitional area between cover and adjacent roof panel. This obviates the need for the conventional, costly adjustment of the closed position of the cover to a mean value, in order to minimize the divergence of the cover from the adjacent roof panel in its closed position as tilting roof on the one hand, and the divergence of the cover from the adjacent roof panel in its closed position as sliding roof on the other.

Various types of vehicles, especially motor vehicles, can be equipped with the slide-and-tilt sunroof operated according to the invention.

According to certain preferred embodiments, the cover, after raising in the direction of the opening edge of the roof opening, is raised further above the opening edge over a lift travel, so that the cover is run towards its elevated position (=open position of the tilting roof). On reaching a desired or predefined tilt position in the direction of the elevated position, the direction of travel of the cover is reversed, that is to say the cover is lowered into the closed position of the tilting roof In the closing action of the sliding roof function, therefore, the final part of the sequence of movements is the same as the final part of the sequence of movements in the closing action of the tilting roof function. The closed position for the sliding roof function can therefore be set lower than in the case of conventional sliding roof closed positions. Any elevation of the cover capable of causing annoying wind noises in excess of certain speeds of travel, due to the pressure ratios inside and outside the vehicle, therefore occurs only at higher speeds. The facility for setting the home position (closed position) lower in the sliding roof function therefore affords a greater safeguard against the occurrence of speed-related wind noises on the slide-and-tilt sunroof.

According to certain preferred embodiments, after driving the cover towards the opening edge of the roof opening, the further sequence of movements of the cover is performed as a function of the speed of travel. The movement of the cover is driven only at certain vehicle speeds, in such a way that the cover reaches the closed position in the same closed position as when closing it from its elevated position. For example, this driven motion occurs only in a specific speed interval, or below or above a predetermined speed (=limit speed, for example 50 km/h or 80 km/h). This is advisable, since at certain speeds the pressure ratios inside and outside the vehicle act on the cover in such a way that they carry it into the desired closed position anyway. In such a case, no "artificial" drive (drive motor, for example) is required in order to bring the cover in its sliding roof function into the closed position of the tilting roof function.

The measures, according to certain preferred embodiments, take account of the natural suction effect acting on the cover, which occurs in excess of a certain vehicle speed (=limit speed), in order to reach the desired closed position of the cover in its sliding roof function. An "artificial" driven motion then raises the cover above the roof opening only if the closing action for the sliding roof function is actuated and performed at speeds lower than or equal to the limit speed. The aforementioned way in which the sequence of movements of the cover in the closing action is dependent on a limit speed also has the advantage that two annoying "closing noises", due on the one hand to the artificially generated sequence of movements of the cover and on the other to the natural pressure effect, are not produced at higher speeds.

Certain preferred embodiments propose an automated sequence of movements for the cover. This enables a suitable sequence of movements for the closing action to be predefined and programmed in a suitable device controlling the movement of the cover by way of a drive motor. The sequence of movements can be conveniently initiated, for example, by an activation signal in the form of an actuated operating element.

The measures in certain preferred embodiments enable any modifications to the sequence of movements or modifications to the lengths of parts of the sequence of movements, necessary as a result of design changes, to be readily made at any time by reprogramming. In this way the sequence of movements of the cover when closing in the sliding roof function can be adapted to different types of vehicles at no exceptional technical cost, by reprogramming individual parameters of the sequence of movements (for example, lengths of partial movements, especially the length of the superelevation travel above the roof opening) as predefined data according to the particular type of vehicle. The aforementioned limit speed can likewise be predetermined, programmed and, if necessary, reprogrammed with a new value.

The invention will be explained in more detail with reference to the exemplary embodiments represented in the figures.

DETAILED DESCRIPTION OF THE DRAWINGS

Figure 1:
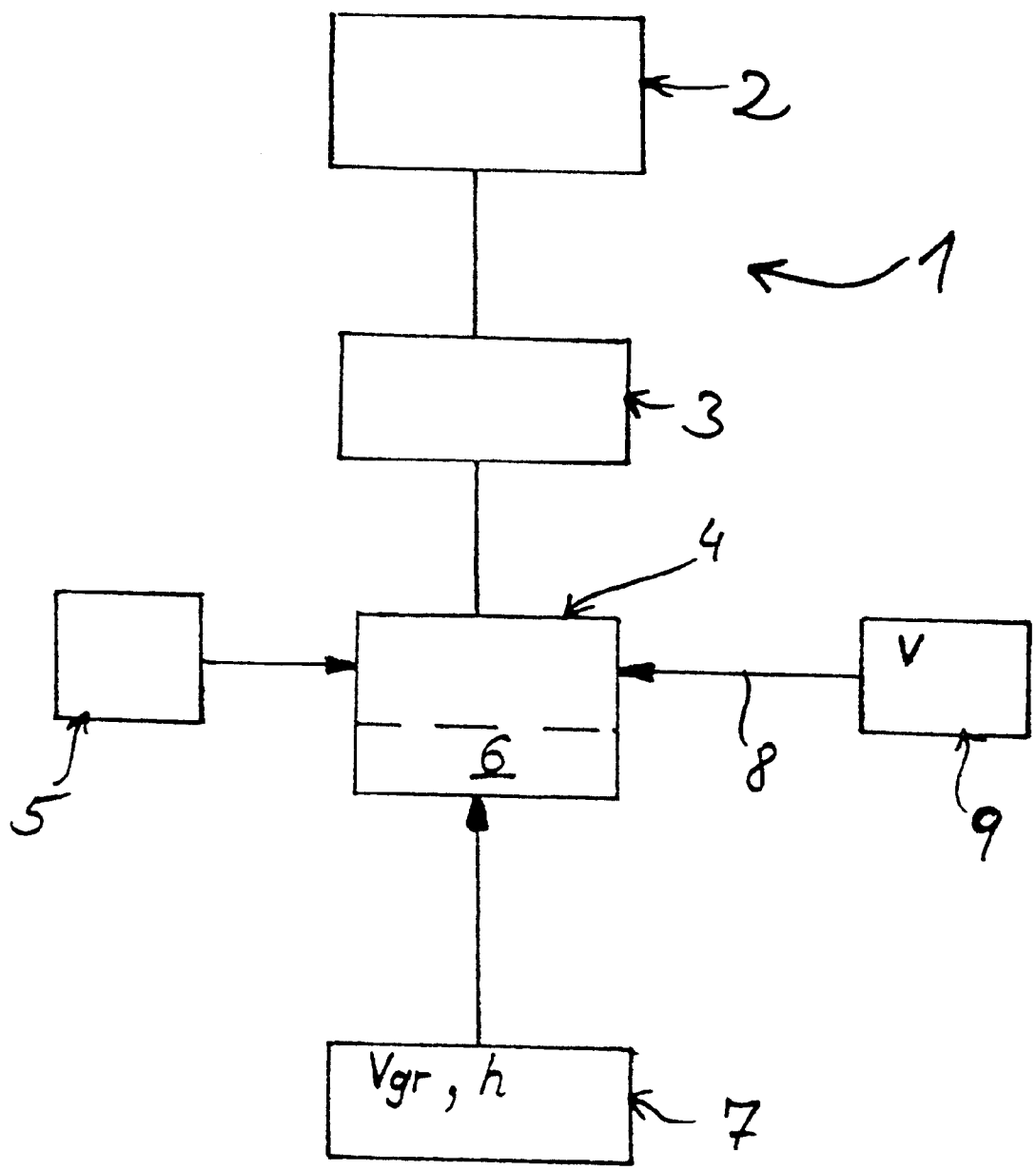
FIG. 1 shows a diagrammatic representation of part of a slide-and-tilt sunroof system.

The slide-and-tilt sunroof system 1 according to FIG. 1 comprises a slide-and-tilt sunroof having a cover 2, which is driven by a roof drive 3 having an electric motor, not represented further here. The roof drive 3 is controlled by a control device 4. An actuating device 5, for example one or more manual operating elements, is connected to the control device 4 for actuation of the cover 2.

The control device 4 preferably comprises a position counter or a position switch input with a timer control, in order to support a correct sequence of movements of the cover 2. The control device 4 includes means of storage 6, in order to program the sequence of movements and/or the travel to be covered by the cover 2. For this purpose the control device 4 is connected to preferably external input means 7. This connection is preferably a detachable connector assembly. Predetermined or predefined data are programmed into the control device 4 by way of the input means 7. These predefined data include, as a minimum, the length of the "superelevation" (to be explained below) of the cover 2 above the roof opening of the vehicle. This superelevation is necessary in order to transport the cover 2 from its open position into the common closed position of tilting roof and sliding roof function. The cover 2 is automatically transported into the desired closed position by means of the programming of its sequence of movements and/or the distance it has to travel. A predetermined value of a limit speed $v_{gr}$ can also be programmed by way of the input means 7.

The control device 4 receives the value for the current speed v of the vehicle by way of the signal line 8. In the control device 4 this value is compared with a pre-programmed value for the limit speed $v_{gr}$. The result of the comparison decides whether the cover 2 is transported from its open position into the closed position with or without the superelevation, yet to be explained. This comparison can be performed immediately prior to initiation of the closing action and/or during the closing action. The comparison can also be performed at regular time intervals.

On the basis of the aforementioned comparison, the initiation or sequence of the closing action explained varies as a function of the current speed v of the vehicle. For example, if $v \leq v_{gr}$ (e.g. 50 km/h), the cover 2 is raised above the outer roof surface 19 in accordance with FIG. 2c, whereas if $v > v_{gr}$ such raising of the cover by the roof drive 3 does not occur.

The control device 4 receives current measuring signals from a measuring device 9, such as a measuring sensor, signal pick-up etc., by way of the signal line 8. In addition to the current speed v, the control device 4 can also receive and process other measuring signals for other physical variables by way of the signal line 8.

The method for the operation of the cover 2 for closing the roof opening 10 of a vehicle, starting from an open position largely exposing the roof opening 10 (FIG. 2a) is explained below.

The roof opening 10 is surrounded by a fixed roof part 11, that is to say a fixed roof panel of the vehicle. In the sliding direction 12 of the cover 2 to be closed, the roof part 11, only represented diagrammatically and in part, has a rear roof area 13 and a forward roof area 14. The inner edge 15 of the roof opening 10 is fitted with a generally enclosed seal 16 arranged in a transverse plane to the plane of the drawing. The said seal 16 is not represented in FIG. 2b to FIG. 2d, solely for the sake of graphic simplicity. A seal corresponding to the inner edge 15 may likewise be arranged on the cover 2 for sealing of the slide-and-tilt sunroof. This seal may supplement or replace the seal 16. It should be mentioned in this context that the components identifiable in the figures and the relative arrangements are only represented diagrammatically and are not to scale.

Figure 2A:
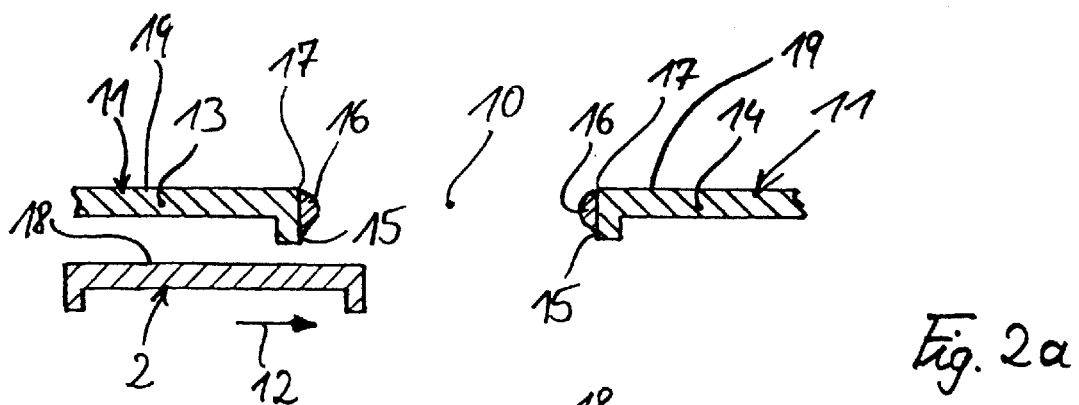
FIGS. 2a to 2d show, in diagrammatic form, successive positions of the cover in its function as a sliding roof in the closing action according to the invention
Figure 2B:
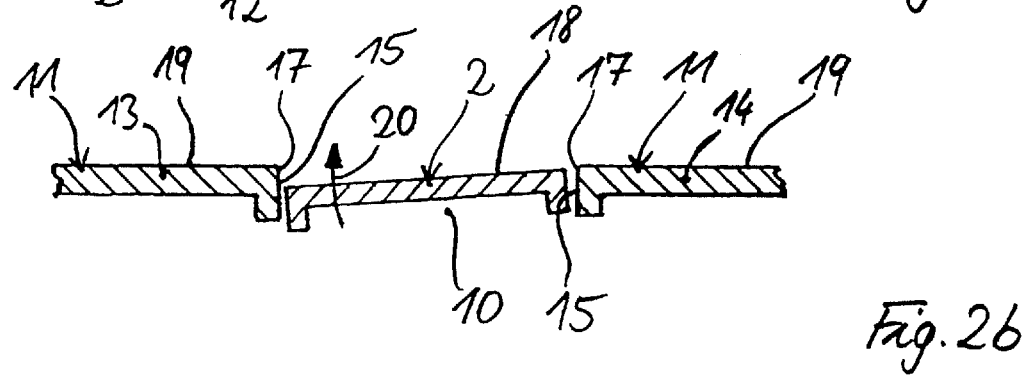

As already stated, the cover 2 in FIG. 2a is in an open position. In order for the cover 2 to reach its closed position closing off the roof opening 10, it is first moved out of its open position in a sliding direction 12 (FIG. 2). The cover 2 is then raised in a tilting movement towards an outer opening edge 17 of the roof opening 10, in order that the outer surface 18 of the cover 2 remote from the vehicle interior finishes as flush as possible with the roof outer surface 19 of the fixed roof part 11. The closed position hereby attained is intended to correspond to the closed position of the cover 2 in its tilting roof function, that is to say the closed position obtained when closing the roof opening 10 from the elevated position of the cover 2 (this position of the cover 2 is represented by dashed lines in FIG. 2c). The friction forces between the cover 2 and the seal 16 occurring in conventional raising of the cover 2 into its closed position in accordance with FIG. 2b mean, however, that the two closed positions (in the tilting roof function on the one hand and the sliding roof function on the other) conventionally deviate from one another to a greater or lesser extent. These deviations occur due to the mechanical play present in and inadequate inherent rigidity of the combined slide-and-tilt action of the sunroof, which means that the support forces of the adjusting mechanism are insufficient for moving the slide-and-tilt sunroof into the same closed position in its sliding roof function on the one hand and its tilting roof function on the other.

Figure 2C:
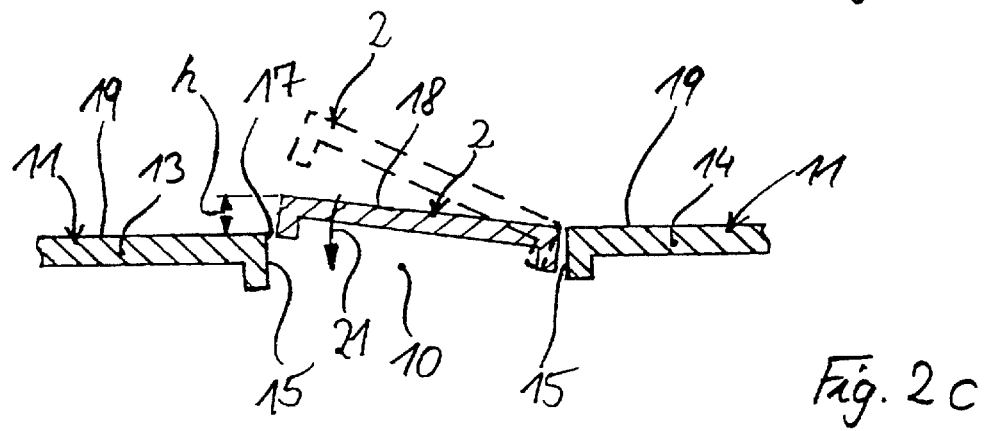
Figure 2D:
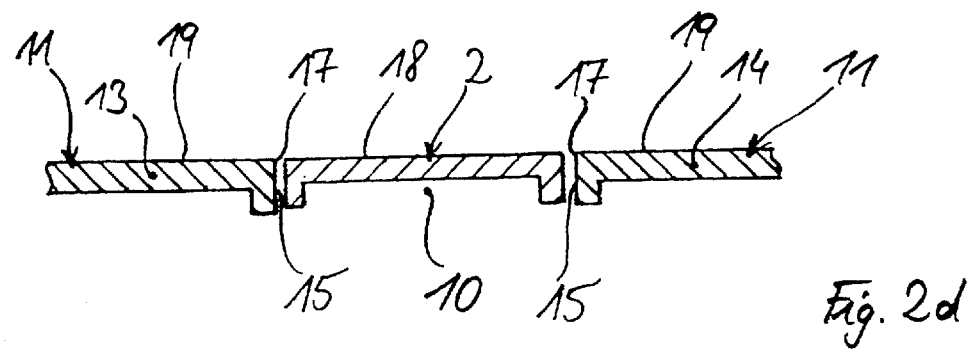

The cover 2 is therefore raised in the tilting direction 20 above the outer opening edge 17 over a predetermined lift travel h towards the elevated position (FIG. 2c). It should be mentioned that in FIG. 2c the elevated position is indicated by dashed lines representing the cover 2, and that the actual elevated position is not reached during the closing action explained. Once the cover 2 has been raised over the lift travel h, the control device 4 reverses the drive direction of the roof drive 3, so that the cover 2 is lowered in the counterlift direction 21 into the closed position (FIG. 2d). To sum up, the sliding roof is driven in the same direction (in this case the counterlift direction 21) as the tilting roof, in order to reach the closed position. This closed position for the cover 2, that is to say a common closed position, can therefore be conveniently achieved in both functions—sliding roof and tilting roof.

What is claimed is:

1. A method for operation of a cover of a slide-and-tilt sunroof for closing a roof opening of a vehicle from an open position, at least partially exposing the roof opening, comprising:

sliding the cover into an area of the roof opening, and moving the cover towards an opening edge of the roof opening, wherein, after commencement of the movement towards the opening edge of the roof opening, the movement of the cover is driven in such a way that the cover reaches a closed position in the same closing direction as when closing from an elevated position.

2. A method according to claim 1, wherein the cover is raised towards the opening edge of the roof opening and is then raised above the opening edge over a lift travel towards the elevated position, and then lowered into the closed position.

3. A method according to claim 1, wherein the movement of the cover is driven as a function of a speed of the vehicle.

4. A method according to claim 2, wherein the cover is only raised over the lift travel in the event of a vehicle speed less than or equal to a predetermined limit speed.

5. A method according to claim 1, wherein the movement of the cover is automatically driven.

6. A method according to claim 1, wherein the cover is driven by way of a roof drive controlled by a programmable control device.

7. A method according to claim 6, wherein the control device is programmed with predetermined data.

8. A method according to claim 7, wherein the predetermined data include at least the length of a lift travel.

9. A method of closing a cover of a slide-and-tilt vehicle roof from an open sliding position which at least partially exposes a roof opening, comprising:

providing the cover in said open sliding position, sliding the cover into an area of the roof opening, moving the cover towards an opening edge of the roof opening, and driving the movement of the cover in the same manner as a closing movement from an open tilting position so that the cover reaches a closed position from the same direction as from the open tilting position.

10. A method according to claim 9, wherein, after the cover is moved towards the opening edge, the cover is raised above the opening edge over a lift travel towards the open tilting position before being lowered into the closed position.

11. A method according to claim 9, wherein the movement of the cover is dependent on a speed of the vehicle.

12. A slide-and-tilt sunroof assembly of a vehicle, comprising:

a roof opening in the vehicle having an opening edge, a cover operatively positionable in an open tilting position which is elevated and an open sliding position which at least partially exposes the roof opening, and a driver which operatively closes the roof opening by directing the cover, wherein the driver closes the cover from the open sliding position by operatively sliding the cover into the roof opening, moving the cover towards the opening edge and driving the movement of the cover so that the cover reaches a closed position in the same closing direction as from the open tilting position.

* * * * *